United States Patent
Markuze et al.

(10) Patent No.: US 12,314,611 B2
(45) Date of Patent: *May 27, 2025

(54) LOGICAL MEMORY ADDRESSING FOR NETWORK DEVICES

(71) Applicant: VMware LLC, Palo Alto, CA (US)

(72) Inventors: Alex Markuze, Rosh HaAyin (IL); Shay Vargaftik, Herzliya (IL); Igor Golikov, Herzliya (IL); Yaniv Ben-Itzhak, Herzliya (IL); Avishay Yanai, Herzliya (IL)

(73) Assignee: VMWare LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/431,790

(22) Filed: Feb. 2, 2024

(65) Prior Publication Data

US 2024/0176551 A1    May 30, 2024

Related U.S. Application Data

(63) Continuation of application No. 17/845,740, filed on Jun. 21, 2022, now Pat. No. 11,928,367.

(51) Int. Cl.
   *G06F 3/06*    (2006.01)
(52) U.S. Cl.
   CPC ............ *G06F 3/067* (2013.01); *G06F 3/0604* (2013.01); *G06F 3/0655* (2013.01)
(58) Field of Classification Search
   CPC ....... G06F 3/067; G06F 3/0604; G06F 3/0655
   See application file for complete search history.

(56) References Cited

U.S. PATENT DOCUMENTS

| | | | |
|---|---|---|---|
| 5,884,313 A | 3/1999 | Talluri et al. |
| 5,887,134 A | 3/1999 | Ebrahim |
| 5,974,547 A | 10/1999 | Klimenko |
| 6,219,699 B1 | 4/2001 | McCloghrie et al. |
| 6,393,483 B1 | 5/2002 | Latif et al. |
| 6,496,935 B1 | 12/2002 | Fink et al. |
| 7,079,544 B2 | 7/2006 | Wakayama et al. |
| 7,424,710 B1 | 9/2008 | Nelson et al. |
| 7,606,260 B2 | 10/2009 | Oguchi et al. |

(Continued)

FOREIGN PATENT DOCUMENTS

| | | |
|---|---|---|
| CA | 2672100 A1 | 6/2008 |
| CA | 2918551 A1 | 7/2010 |

(Continued)

OTHER PUBLICATIONS

Angeles, S., Cloud vs. Data Center: What's the Difference?, https://www.businessnewsdaily.com/4982-cloud-vs-data-center.html, Nov. 23, 2018, 1 page.

(Continued)

*Primary Examiner* — Jae U Yu
(74) *Attorney, Agent, or Firm* — Quarles & Brady LLP

(57) ABSTRACT

Some embodiments provide a method for, at a network interface controller (NIC) of a computer, accessing data in a network. From the computer, the method receives a request to access data stored at a logical memory address. The method translates the logical memory address into a memory address of a particular network device storing the requested data. The method sends a data message to the particular network device to retrieve the requested data.

20 Claims, 8 Drawing Sheets

(56) References Cited

U.S. PATENT DOCUMENTS

| | | |
|---|---|---|
| 7,849,168 B2 | 12/2010 | Utsunomiya et al. |
| 7,853,998 B2 | 12/2010 | Blaisdell et al. |
| 8,346,919 B1 | 1/2013 | Eiriksson et al. |
| 8,442,059 B1 | 5/2013 | de la Iglesia et al. |
| 8,660,129 B1 | 2/2014 | Brendel et al. |
| 8,825,900 B1 | 9/2014 | Gross, IV et al. |
| 8,856,518 B2 | 10/2014 | Sridharan et al. |
| 8,930,529 B1 | 1/2015 | Wang et al. |
| 8,931,047 B2 | 1/2015 | Wanser et al. |
| 9,008,085 B2 | 4/2015 | Kamble et al. |
| 9,047,109 B1 | 6/2015 | Wang et al. |
| 9,116,727 B2 | 8/2015 | Benny et al. |
| 9,135,044 B2 | 9/2015 | Maharana |
| 9,143,582 B2 | 9/2015 | Banavalikar et al. |
| 9,148,895 B2 | 9/2015 | PalChaudhuri et al. |
| 9,152,593 B2 | 10/2015 | Galles |
| 9,154,327 B1 | 10/2015 | Marino et al. |
| 9,197,551 B2 | 11/2015 | DeCusatis et al. |
| 9,231,849 B2 | 1/2016 | Hyoudou et al. |
| 9,325,739 B1 | 4/2016 | Roth et al. |
| 9,378,161 B1 | 6/2016 | Dalal et al. |
| 9,380,027 B1 | 6/2016 | Lian et al. |
| 9,419,897 B2 | 8/2016 | Cherian et al. |
| 9,460,031 B1 | 10/2016 | Dalal et al. |
| 9,621,516 B2 | 4/2017 | Basak et al. |
| 9,634,990 B2 | 4/2017 | Lee |
| 9,692,698 B2 | 6/2017 | Cherian et al. |
| 9,697,019 B1 | 7/2017 | Fitzgerald et al. |
| 9,755,903 B2 | 9/2017 | Masurekar et al. |
| 9,806,948 B2 | 10/2017 | Masurekar et al. |
| 9,916,269 B1 | 3/2018 | Machulsky et al. |
| 9,952,782 B1 | 4/2018 | Chandrasekaran et al. |
| 10,050,884 B1 | 8/2018 | Dhanabalan et al. |
| 10,142,127 B2 | 11/2018 | Cherian et al. |
| 10,162,793 B1 | 12/2018 | Bshara et al. |
| 10,193,771 B2 | 1/2019 | Koponen et al. |
| 10,284,478 B2 | 5/2019 | Yokota |
| 10,341,296 B2 | 7/2019 | Bhagwat et al. |
| 10,534,629 B1 | 1/2020 | St. Pierre et al. |
| 10,567,308 B1 | 2/2020 | Subbiah et al. |
| 10,873,566 B2 | 12/2020 | Han |
| 10,997,106 B1 | 5/2021 | Bandaru et al. |
| 11,005,755 B2 | 5/2021 | Yu et al. |
| 11,038,845 B2 | 6/2021 | Han |
| 11,108,593 B2 | 8/2021 | Cherian et al. |
| 11,221,972 B1 | 1/2022 | Raman et al. |
| 11,385,981 B1 | 7/2022 | Silakov et al. |
| 11,593,278 B2 | 2/2023 | Kim et al. |
| 11,606,310 B2 | 3/2023 | Ang et al. |
| 11,636,053 B2 | 4/2023 | Kim et al. |
| 11,677,719 B2 | 6/2023 | Han |
| 11,716,383 B2 | 8/2023 | Kim et al. |
| 11,736,565 B2 | 8/2023 | Cherian et al. |
| 11,736,566 B2 | 8/2023 | Cherian et al. |
| 11,899,594 B2 | 2/2024 | Vargaftik et al. |
| 11,928,062 B2 | 3/2024 | Vargaftik et al. |
| 2002/0069245 A1 | 6/2002 | Kim |
| 2003/0097589 A1 | 5/2003 | Syvanne |
| 2003/0130833 A1 | 7/2003 | Brownell et al. |
| 2003/0140124 A1 | 7/2003 | Burns |
| 2003/0145114 A1 | 7/2003 | Gertner |
| 2003/0200290 A1 | 10/2003 | Zimmerman et al. |
| 2003/0217119 A1 | 11/2003 | Raman et al. |
| 2004/0042464 A1 | 3/2004 | Etzur et al. |
| 2005/0053079 A1 | 3/2005 | Havala |
| 2006/0029056 A1 | 2/2006 | Perera et al. |
| 2006/0041894 A1 | 2/2006 | Cheng et al. |
| 2006/0206603 A1 | 9/2006 | Rajan et al. |
| 2006/0206655 A1 | 9/2006 | Chappell et al. |
| 2006/0236054 A1 | 10/2006 | Kitamura |
| 2007/0056038 A1 | 3/2007 | Lok |
| 2007/0174850 A1 | 7/2007 | Zur |
| 2008/0008202 A1 | 1/2008 | Terrell et al. |
| 2008/0086620 A1 | 4/2008 | Morris |
| 2008/0163207 A1 | 7/2008 | Reumann et al. |
| 2008/0267177 A1 | 10/2008 | Johnson et al. |
| 2009/0089537 A1 | 4/2009 | Vick et al. |
| 2009/0119087 A1 | 5/2009 | Ang et al. |
| 2009/0161547 A1 | 6/2009 | Riddle et al. |
| 2009/0161673 A1 | 6/2009 | Breslau et al. |
| 2009/0249472 A1 | 10/2009 | Litvin et al. |
| 2010/0070677 A1 | 3/2010 | Thakkar |
| 2010/0115208 A1 | 5/2010 | Logan |
| 2010/0165874 A1 | 7/2010 | Brown et al. |
| 2010/0275199 A1 | 10/2010 | Smith et al. |
| 2010/0287306 A1 | 11/2010 | Matsuda |
| 2011/0060859 A1 | 3/2011 | Shukla et al. |
| 2011/0219170 A1 | 9/2011 | Frost et al. |
| 2012/0042138 A1 | 2/2012 | Eguchi et al. |
| 2012/0072909 A1 | 3/2012 | Malik et al. |
| 2012/0079478 A1 | 3/2012 | Galles et al. |
| 2012/0096459 A1 | 4/2012 | Miyazaki |
| 2012/0163388 A1 | 6/2012 | Goel et al. |
| 2012/0167082 A1 | 6/2012 | Kumar et al. |
| 2012/0207174 A1 | 8/2012 | Shieh |
| 2012/0259953 A1 | 10/2012 | Gertner |
| 2012/0278584 A1 | 11/2012 | Nagami et al. |
| 2012/0290703 A1 | 11/2012 | Barabash et al. |
| 2012/0320918 A1 | 12/2012 | Fomin et al. |
| 2013/0033993 A1 | 2/2013 | Cardona et al. |
| 2013/0058346 A1 | 3/2013 | Sridharan et al. |
| 2013/0073702 A1 | 3/2013 | Umbehocker |
| 2013/0125122 A1 | 5/2013 | Hansen |
| 2013/0125230 A1 | 5/2013 | Koponen et al. |
| 2013/0145106 A1 | 6/2013 | Kan |
| 2013/0311663 A1 | 11/2013 | Kamath et al. |
| 2013/0318219 A1 | 11/2013 | Kancheria |
| 2013/0318268 A1 | 11/2013 | Dalal et al. |
| 2014/0003442 A1 | 1/2014 | Hernandez et al. |
| 2014/0056151 A1 | 2/2014 | Petrus et al. |
| 2014/0067763 A1 | 3/2014 | Jorapurkar et al. |
| 2014/0074799 A1 | 3/2014 | Karampuri et al. |
| 2014/0098815 A1 | 4/2014 | Mishra et al. |
| 2014/0115578 A1 | 4/2014 | Cooper et al. |
| 2014/0123211 A1 | 5/2014 | Wanser et al. |
| 2014/0164595 A1 | 6/2014 | Bray et al. |
| 2014/0195666 A1 | 7/2014 | Dumirtriu et al. |
| 2014/0201305 A1 | 7/2014 | Dalal et al. |
| 2014/0208075 A1 | 7/2014 | McCormick, Jr. |
| 2014/0215036 A1 | 7/2014 | Elzur |
| 2014/0244983 A1 | 8/2014 | McDonald et al. |
| 2014/0245296 A1 | 8/2014 | Sethuramalingam et al. |
| 2014/0245423 A1 | 8/2014 | Lee |
| 2014/0269712 A1 | 9/2014 | Kidambi |
| 2014/0269754 A1 | 9/2014 | Eguchi et al. |
| 2014/0376367 A1 | 12/2014 | Jain et al. |
| 2015/0007317 A1 | 1/2015 | Jain |
| 2015/0016300 A1 | 1/2015 | Devireddy et al. |
| 2015/0019748 A1 | 1/2015 | Gross, IV et al. |
| 2015/0020067 A1 | 1/2015 | Brant et al. |
| 2015/0033222 A1 | 1/2015 | Hussain et al. |
| 2015/0052280 A1 | 2/2015 | Lawson |
| 2015/0117445 A1 | 4/2015 | Koponen et al. |
| 2015/0156250 A1 | 6/2015 | Varshney et al. |
| 2015/0172183 A1 | 6/2015 | DeCusatis et al. |
| 2015/0200808 A1 | 7/2015 | Gourtay et al. |
| 2015/0212892 A1 | 7/2015 | Li et al. |
| 2015/0215207 A1 | 7/2015 | Qin et al. |
| 2015/0222547 A1 | 8/2015 | Hayut et al. |
| 2015/0237013 A1 | 8/2015 | Bansal et al. |
| 2015/0242134 A1 | 8/2015 | Takada et al. |
| 2015/0261556 A1 | 9/2015 | Jain et al. |
| 2015/0261720 A1 | 9/2015 | Kagan et al. |
| 2015/0281178 A1 | 10/2015 | Raman et al. |
| 2015/0281179 A1 | 10/2015 | Raman et al. |
| 2015/0326532 A1 | 11/2015 | Grant et al. |
| 2015/0347231 A1 | 12/2015 | Gopal et al. |
| 2015/0358288 A1 | 12/2015 | Jain et al. |
| 2015/0358290 A1 | 12/2015 | Jain et al. |
| 2016/0006696 A1 | 1/2016 | Donley et al. |
| 2016/0092108 A1 | 3/2016 | Karaje et al. |
| 2016/0134702 A1 | 5/2016 | Gertner |
| 2016/0156591 A1 | 6/2016 | Zhou et al. |
| 2016/0162302 A1 | 6/2016 | Warszawski et al. |

(56) References Cited

U.S. PATENT DOCUMENTS

| | | |
|---|---|---|
| 2016/0162438 A1 | 6/2016 | Hussain et al. |
| 2016/0179579 A1 | 6/2016 | Amann et al. |
| 2016/0182342 A1 | 6/2016 | Singaravelu et al. |
| 2016/0239330 A1 | 8/2016 | Bride et al. |
| 2016/0285913 A1 | 9/2016 | Itskin et al. |
| 2016/0294858 A1 | 10/2016 | Woolward et al. |
| 2016/0306648 A1 | 10/2016 | DeGuillard et al. |
| 2017/0005986 A1 | 1/2017 | Bansal et al. |
| 2017/0024334 A1 | 1/2017 | Bergsten et al. |
| 2017/0075845 A1 | 3/2017 | Kopparthi |
| 2017/0093623 A1 | 3/2017 | Zheng |
| 2017/0099532 A1 | 4/2017 | Kakande |
| 2017/0104790 A1 | 4/2017 | Meyers et al. |
| 2017/0118173 A1 | 4/2017 | Arramreddy et al. |
| 2017/0134433 A1 | 5/2017 | Hugenbruch et al. |
| 2017/0161090 A1 | 6/2017 | Kodama |
| 2017/0161189 A1 | 6/2017 | Gertner |
| 2017/0177396 A1 | 6/2017 | Palermo et al. |
| 2017/0180414 A1 | 6/2017 | Andrews et al. |
| 2017/0180477 A1 | 6/2017 | Hashimoto |
| 2017/0187679 A1 | 6/2017 | Basak et al. |
| 2017/0195454 A1 | 7/2017 | Shieh |
| 2017/0208100 A1 | 7/2017 | Lian et al. |
| 2017/0214549 A1 | 7/2017 | Yoshino et al. |
| 2017/0244671 A1 | 8/2017 | Kamalakantha et al. |
| 2017/0264622 A1 | 9/2017 | Cooper et al. |
| 2018/0024775 A1 | 1/2018 | Miller |
| 2018/0024964 A1 | 1/2018 | Mao et al. |
| 2018/0032249 A1 | 2/2018 | Makhervaks et al. |
| 2018/0088978 A1 | 3/2018 | Li et al. |
| 2018/0095872 A1 | 4/2018 | Dreier et al. |
| 2018/0109471 A1 | 4/2018 | Chang et al. |
| 2018/0152540 A1 | 5/2018 | Niell et al. |
| 2018/0203719 A1 | 7/2018 | Zhang et al. |
| 2018/0260125 A1 | 9/2018 | Botes et al. |
| 2018/0262599 A1 | 9/2018 | Firestone |
| 2018/0278684 A1 | 9/2018 | Rashid et al. |
| 2018/0309641 A1 | 10/2018 | Wang et al. |
| 2018/0309718 A1 | 10/2018 | Zuo |
| 2018/0329743 A1 | 11/2018 | Pope et al. |
| 2018/0331976 A1 | 11/2018 | Pope et al. |
| 2018/0336346 A1 | 11/2018 | Guenther |
| 2018/0337991 A1 | 11/2018 | Kumar et al. |
| 2018/0349037 A1 | 12/2018 | Zhao et al. |
| 2018/0359215 A1 | 12/2018 | Khare et al. |
| 2019/0026146 A1 | 1/2019 | Peffers et al. |
| 2019/0042506 A1 | 2/2019 | Devey et al. |
| 2019/0044809 A1 | 2/2019 | Willis et al. |
| 2019/0044866 A1 | 2/2019 | Chilikin et al. |
| 2019/0065526 A1 | 2/2019 | Ribeiro et al. |
| 2019/0075063 A1 | 3/2019 | McDonnell et al. |
| 2019/0102096 A1* | 4/2019 | Loewen .............. G06F 3/0625 |
| 2019/0132296 A1 | 5/2019 | Jiang et al. |
| 2019/0200105 A1 | 6/2019 | Cheng et al. |
| 2019/0235909 A1 | 8/2019 | Jin et al. |
| 2019/0278675 A1 | 9/2019 | Bolkhovitin et al. |
| 2019/0280980 A1 | 9/2019 | Hyoudou |
| 2019/0286373 A1 | 9/2019 | Karumbunathan et al. |
| 2019/0306083 A1 | 10/2019 | Shih et al. |
| 2020/0021532 A1 | 1/2020 | Borikar et al. |
| 2020/0028785 A1 | 1/2020 | Ang et al. |
| 2020/0028800 A1 | 1/2020 | Strathman et al. |
| 2020/0042234 A1 | 2/2020 | Krasner et al. |
| 2020/0042389 A1 | 2/2020 | Kulkarni et al. |
| 2020/0042412 A1 | 2/2020 | Kulkarni et al. |
| 2020/0133909 A1 | 4/2020 | Hefty et al. |
| 2020/0136996 A1 | 4/2020 | Li et al. |
| 2020/0213227 A1 | 7/2020 | Pianigiani et al. |
| 2020/0259731 A1 | 8/2020 | Sivaraman et al. |
| 2020/0278892 A1 | 9/2020 | Nainar et al. |
| 2020/0278893 A1 | 9/2020 | Niell et al. |
| 2020/0314011 A1 | 10/2020 | Deval et al. |
| 2020/0319812 A1 | 10/2020 | He et al. |
| 2020/0328192 A1 | 10/2020 | Zaman et al. |
| 2020/0382329 A1 | 12/2020 | Yuan |
| 2020/0401320 A1 | 12/2020 | Pyati et al. |
| 2020/0412659 A1 | 12/2020 | Ilitzky et al. |
| 2021/0019270 A1 | 1/2021 | Li et al. |
| 2021/0026670 A1 | 1/2021 | Krivenok et al. |
| 2021/0058342 A1 | 2/2021 | McBrearty |
| 2021/0226846 A1 | 7/2021 | Ballard et al. |
| 2021/0232528 A1 | 7/2021 | Kutch et al. |
| 2021/0266259 A1 | 8/2021 | Renner, III et al. |
| 2021/0314232 A1 | 10/2021 | Nainar et al. |
| 2021/0357242 A1 | 11/2021 | Ballard et al. |
| 2021/0359955 A1 | 11/2021 | Musleh et al. |
| 2021/0377166 A1 | 12/2021 | Brar et al. |
| 2021/0377188 A1 | 12/2021 | Ghag et al. |
| 2021/0392017 A1 | 12/2021 | Cherian et al. |
| 2021/0409317 A1 | 12/2021 | Seshan et al. |
| 2022/0027147 A1 | 1/2022 | Maddukuri et al. |
| 2022/0043572 A1 | 2/2022 | Said et al. |
| 2022/0100432 A1 | 3/2022 | Kim et al. |
| 2022/0100491 A1 | 3/2022 | Voltz et al. |
| 2022/0100542 A1 | 3/2022 | Voltz |
| 2022/0100544 A1 | 3/2022 | Voltz |
| 2022/0100545 A1 | 3/2022 | Cherian et al. |
| 2022/0103487 A1 | 3/2022 | Ang et al. |
| 2022/0103488 A1 | 3/2022 | Wang et al. |
| 2022/0150055 A1 | 5/2022 | Cui et al. |
| 2022/0164451 A1 | 5/2022 | Bagwell |
| 2022/0197681 A1 | 6/2022 | Rajagopal |
| 2022/0206908 A1 | 6/2022 | Brar et al. |
| 2022/0210229 A1 | 6/2022 | Maddukuri et al. |
| 2022/0231968 A1 | 7/2022 | Rajagopal |
| 2022/0272039 A1 | 8/2022 | Cardona et al. |
| 2022/0335563 A1 | 10/2022 | Elzur |
| 2023/0004508 A1 | 1/2023 | Liu et al. |
| 2023/0195488 A1 | 6/2023 | Ang et al. |
| 2023/0195675 A1 | 6/2023 | Ang et al. |
| 2023/0198833 A1 | 6/2023 | Ang et al. |
| 2023/0291709 A1 | 9/2023 | Han |
| 2023/0370428 A1 | 11/2023 | Jain et al. |
| 2023/0385094 A1 | 11/2023 | Markuze et al. |
| 2023/0396563 A1 | 12/2023 | Ang et al. |
| 2023/0409225 A1 | 12/2023 | Markuze et al. |
| 2024/0039994 A1 | 2/2024 | Cherian et al. |

FOREIGN PATENT DOCUMENTS

| | | |
|---|---|---|
| CN | 101258725 A | 9/2008 |
| CN | 101540826 A | 9/2009 |
| DE | 102018004046 A1 | 11/2018 |
| EP | 1482711 A2 | 12/2004 |
| EP | 2828760 A1 | 1/2015 |
| EP | 3598291 A1 | 1/2020 |
| EP | 4160424 A2 | 4/2023 |
| TW | 202107297 A | 2/2021 |
| WO | 2005099201 A2 | 10/2005 |
| WO | 2007036372 A1 | 4/2007 |
| WO | 2010008984 A2 | 1/2010 |
| WO | 2016003489 A1 | 1/2016 |
| WO | 2020027913 A1 | 2/2020 |
| WO | 2020211071 A1 | 10/2020 |
| WO | 2021030020 A1 | 2/2021 |
| WO | 2022066267 A1 | 3/2022 |
| WO | 2022066268 A1 | 3/2022 |
| WO | 2022066270 A1 | 3/2022 |
| WO | 2022066271 A1 | 3/2022 |
| WO | 2022066531 A1 | 3/2022 |
| WO | 2023121720 A1 | 6/2023 |

OTHER PUBLICATIONS

Anwer, M. et al., Building a Fast, Virtualized Data Plane with Programmable Hardware, VISA '09, Barcelona, Spain, Aug. 17, 2009, 8 pages.

Author Unknown, Transparent, Free On-Line Dictionary of Computing (FOLDOC), http://foldoc.org/transparent, Jun. 6, 1996, 1 page.

Author Unknown, Network Functions Virtualisation; Infrastructure Architecture; Architecture of the Hypervisor Domain, Draft ETSI GS NFV-INF 004 V0.3.1, France, May 2014, 50 pages.

(56) References Cited

OTHER PUBLICATIONS

Author Unkown, What is End-to-End Encryption and How Does it Work?, Proton Technologies AG, Geneva, Switzerland, Mar. 7, 2018, 4 pages.

Author Unknown, Middlebox, Wikipedia.com, Nov. 19, 2019, 1 page.

Author Unknown, An Introduction to SmartNICs, The Next Platform, https://www.nextplatform.com/2019/03/04/an-introduction-to-smartnics/, Mar. 4, 2019, 4 pages.

Author Unknown, In-Hardware Storage Virtualization-NVme SNAP(TM) Revolutionizes Data Center Storage: Composable Storage Made Simple, Mellanox Technologies, Sunnyvale, CA, USA, 2019, 3 pages.

Author Unknown, vSAN Planning and Deployment, Update 3, VMware, Inc., Palo Alto, CA, USA, Aug. 20, 2019, 85 pages.

Author Unknown, Hypervisor, VMware.com, Aug. 13, 2020, 1 page.

Author Unknown, 8.6 Receive-Side Scaling (RSS), Red Hat, Inc., 2020, 2 pages.

Author Unknown, Package Manager, Wikipedia, Sep. 8, 2020, 10 pages.

Author Unknown, VMDK, Wikipedia, May 17, 2020, 3 pages.

Author Unkown, vSphere Managed Inventory Objects, https://docs.vmware.com/en/VMware-vSphere/6.7/com.vmware.vsphere.vcenterhost.doc/GUID-4D4B3DF2-D033-4782-A030-3C3600DE5A7F.html, VMware, Inc., Aug. 3, 2020, 3 pages.

Doyle, L., An Introduction to Smart NICs and Their Benefits, https://www.techtargeet.com/searchnetworking/tip/An-introduction-to-smart-NICs-and-their-benefits, Jul. 2019, 2 pages.

Grant, S. et al., SmartNIC Performance Isolation with FairNIC: Programmable Networking for the Cloud, SIGCOMM '20, ACM, Virtual Event, USA, Aug. 10-14, 2020, 13 pages.

Harris, J., Accelerating NVME-oF* for VMs with the Storage Performance Development Kit, Flash Memory Summit, Intel Corporation, Santa Clara, CA, Aug. 2017, 18 pages.

Herbert, T. et al., Scaling in the Linux Networking Stack, https://www.kernel.org/doc/Documentation/networking/scaling.txt, Jun. 2, 2020, 9 pages.

Koponen, T. et al., Network Virtualization in Multi-Tenant Datacenters, Technical Report TR-2013-001E, VMware, Inc., Palo Alto, CA, USA, Aug. 2013, 22 pages.

Levasseur, J. et al., Standardized but Flexible I/O for Self-Virtualizing Devices, Space, 2008, 13(11), 7 pages.

Li, J. et al., DrawerPipe: A Reconfigurable Pipeline for Network Processing on FGPA-Based SmartNIC, Electronics, 2020, 9:59, pp. 1-24.

Linguaglossa, L. et al., Survey of Performance Acceleration Techniques for Network Function Virtualization, Proceedings of the IEEE, 2019, 107(4):746-764.

Liu, M. et al., Offloading Distributed Applications onto SmartNICs Using iPipe, SIGCOMM '19, ACM, Beijing, China, Aug. 19-23, 2019, pp. 318-333.

Mohammadkhan, A. et al., P4NFV: P4 Enabled NFV Systems with SmartNICs, 2019 IEEE Conference on Network Function Virtualization and Software Defined Networks (NFV-SDN), Nov. 12-14, 2019, 7 pages.

Olds, D., OS Virtualization vs. Hypervisor: Why You Should Offer Both, www.techtarget.com, Oct. 19, 2008, 3 pages.

Perlroth, N., What is End-to-End Encryption? Another Bull's-Eye on Big Tech, The New York Times, https://www.nytimes.com/2019/11/19/technology/end-to-end-encryption.html, Nov. 19, 2019, 4 pages.

Peterson, L. et al., OS Support for General-Purpose Routers, In Proceedings of the Seventh Workshop on Hot Topics in Operating Systems, IEEE, 1999, pp. 38-43.

Pettit, J. et al., Virtual Switching in an Era of Advanced Edges, In Proc. 2nd Workshop on Data Center—Converged and Virtual Ethernet Switching (DCCAVES), vol. 22, ITC, Sep. 2010, 7 pages.

Spalink, T. et al., Building a Robust Software-Based Router Using Network Processors, ACM SIGOPS Operating Systems Review, 2001, 35(5):216-229.

Stringer, J. et al., OVS Hardware Offloads Discussion Panel, http://openvswitch.org/support/ovscon2016/7/1450-stringer.pdf, Nov. 7, 2016 37 pages.

Suarez, J., Reduce TCO with Arm Based SmartNICs, https://community.arm.com/arm-community-blogs/b/architectures-and-processors-blog/posts/reduce-tco-with-arm-based-smartnics, Nov. 14, 2019, 12 pages.

Turner, J. et al., Supercharging PlanetLab—A High Performance, Multi-Application, Overlay Network Platform, ACM SIGCOMM Computer Communication Review, 2007, 37(4):85-96.

* cited by examiner

LOGICAL MEMORY ADDRESSING FOR NETWORK DEVICES

CROSS-REFERENCE TO RELATED APPLICATION

This application is a continuation of U.S. patent application Ser. No. 17/845,740 filed on Jun. 21, 2022, the disclosure of which is incorporated by reference herein.

BACKGROUND

Especially in the datacenter context, programmable smart network interface controllers (NICs) are becoming more commonplace. These smart NICs typically include a central processing unit (CPU), possibly in addition to one or more application-specific integrated circuits (ASICs) or field-programmable gate arrays (FPGAs). These ASICs (or FPGAs) can be designed for packet processing as well as other uses. However, the inclusion of the CPU also allows for more configurability of the smart NICs, thereby enabling the offloading of some tasks from software of a host computer.

BRIEF SUMMARY

Some embodiments provide a network interface controller (NIC) of a computer that translates logical memory addresses into memory addresses for accessing network devices such that the memory access is transparent to client processes running on the computer. That is, a logical memory is defined that spans one or more devices accessible through a network (and may also include local device memory of the computer). The NIC, in some embodiments, is a smart NIC that includes at least a configurable processor for more than simply performing basic I/O data message handling. The NIC is configured to receive a logical memory address from the computer (e.g., from a client process executing on the computer), translate the logical memory address into a memory address for accessing a particular network device, and send a data message to the particular network device to retrieve the requested data and provide that data to the requesting process.

The network devices, in some embodiments are non-volatile memory express (NVMe) devices that are accessible via NVMe-over-fabric protocols (e.g., NVMe-over-TCP). To access a particular device, the NIC translates the logical memory address in a data request into a specification of the particular device as well as a physical or logical address readable by the NVMe device (i.e., that can be used in the NVMe-over-fabric message). In some embodiments, the translation of the logical memory address specifies a network address (e.g., IP address) for the remote device as well as the memory address readable by the NVMe device. In some embodiments, the logical memory address is translated directly into an NVMe-over-fabric message that includes the TCP and IP headers, the NVMe protocol fields, and the memory address for the remote device. The NIC sends this data message to the network device in order to retrieve the requested data and, in response, receives one or more data messages conveying the requested data (which the NIC can then provide to the requesting process).

In some embodiments, the network devices are a set of storage devices separate from the client computer accessible through the network (e.g., in the same datacenter). These storage devices are accessed by the NICs of multiple computers. These computers, in some embodiments, all execute similar client processes (e.g., multiple computers implementing a distributed machine learning process that retrieve machine learning parameters and/or inputs from the storage devices). In other embodiments, the computers may operate unrelated client processes that simply use the set of storage devices for their own respective inputs and/or outputs.

In some embodiments, the network devices include computers on which the client processes operate. In this case, some of the logical memory addresses are translated into memory accesses of the local CPU memory or a local NVMe device rather than a remote network device. For instance, in the previously-mentioned distributed machine learning process, each of the computers performing training of a machine learning model might also store a subset of the network inputs.

As mentioned, the storage arrangement is transparent to the client processes (in fact is transparent to the CPUs of the computers that access the data). When a computer is booted up, the NIC sends a request to the network to learn the logical memory address translation configuration (e.g., to learn a set of page tables). In some embodiments, a central storage manager sends the translation configuration to the NIC so that the NIC can store this translation configuration and use the configuration for logical memory addresses. In other embodiments, each network device that stores data sends its information to the NIC in order for the NIC to generate the translation configuration. In either case, when data is moved to a new storage location, the change is conveyed to the NICs that access the data in terms of a configuration update. In some embodiments, a grace period is provided, such that data being moved is stored at its old location for a period of time after the new configuration is sent, before being deleted from the old location. The client processes can continue sending their data requests without any knowledge of the new data locations.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and the Drawings is needed. Moreover, the claimed subject matters are not to be limited by the illustrative details in the Summary, Detailed Description, and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a network interface controller (NIC) of a computer that translates logical memory addresses into memory addresses for accessing network devices such that the memory access is transparent to client processes running on the computer. That is, a logical memory is defined that spans one or more devices accessible through a network (and may also include local device memory of the computer). The NIC, in some embodiments, is a smart NIC that includes at least a configurable processor for more than simply performing basic I/O data message handling. The smart NIC is configured to receive a logical memory address from the computer (e.g., from a client process executing on the computer), translate the logical memory address into a memory address for accessing a particular network device, and send a data message to the particular network device to retrieve the requested data and provide that data to the requesting process.

The network devices, in some embodiments are non-volatile memory express (NVMe) devices that are accessible via NVMe-over-fabric protocols (e.g., NVMe-over-TCP). To access a particular device, the NIC translates the logical memory address in a data request into a specification of the particular device as well as a physical or logical address readable by the NVMe device (i.e., that can be used in the NVMe-over-fabric message). In some embodiments, the translation of the logical memory address specifies a network address (e.g., IP address) for the remote device as well as the memory address readable by the NVMe device. In some embodiments, the logical memory address is translated directly into an NVMe-over-fabric message that includes the TCP and IP headers, the NVMe protocol fields, and the memory address for the remote device. The NIC sends this data message to the network device in order to retrieve the requested data and, in response, receives one or more data messages conveying the requested data (which the NIC can then provide to the requesting process).

The smart NIC, in some embodiments, is a configurable network interface controller that includes a general-purpose CPU (e.g., an ARM or x86 processor), which is typically low-power compared to the processor of the computer for which the smart NIC acts as the network interface, in addition to one or more application-specific circuits (e.g., data message processing circuits). In other embodiments, the smart NIC is a NIC with a low-power processor that can be configured to perform logical memory address translation but does not include a full general-purpose CPU with its own operating system.

Figure 1:
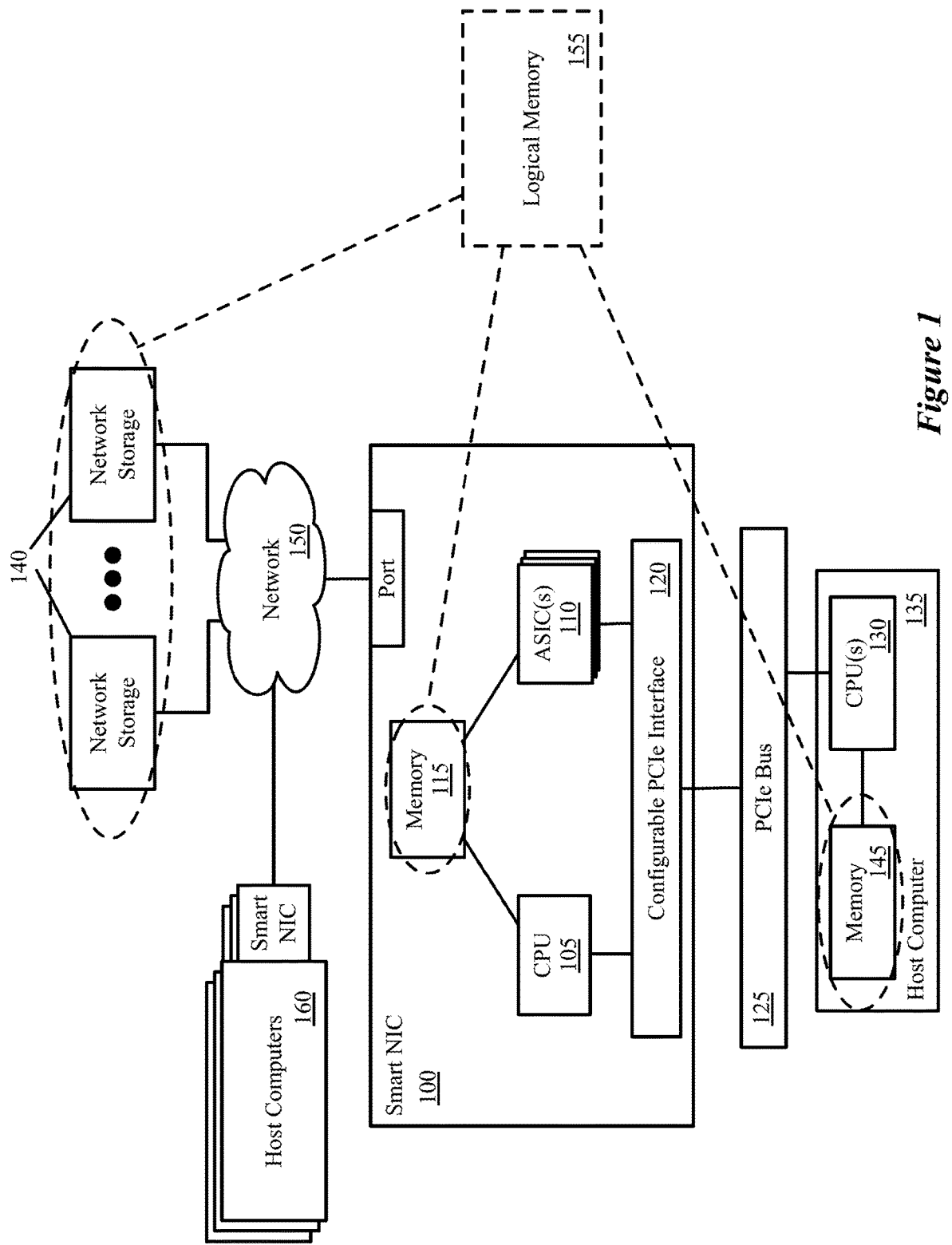
FIG. 1 conceptually illustrates the hardware of a smart NIC of some embodiments that can be configured to translate logical memory addresses into memory addresses for accessing network devices.

FIG. 1 conceptually illustrates the hardware of a smart NIC 100 of some embodiments that can be configured to translate logical memory addresses into memory addresses for accessing network devices. As shown, the smart NIC 100 includes its own general-purpose (e.g., x86 or ARM) CPU 105, a set of application-specific integrated circuit (ASICs) 110, memory 115, and a configurable PCIe interface 120. The ASICs 110, in some embodiments, include at least one I/O ASIC that handles the processing of data messages forwarded to and from the computer (e.g., performing forwarding according to a set of forwarding entries). In some embodiments, these ASICs 110 are at least partly controlled by the CPU 105. In some embodiments, either in addition to or as an alternative to the ASICs, the smart NIC may include a set of configurable field-programmable gate arrays (FPGAs). It should be noted that, in some embodiments, the CPU is a lightweight processor (e.g., not an ARM or x86 processor) that only functions to perform logical memory address translation. In other embodiments, the NIC 100 does not include a general-purpose processor at all and instead an ASIC or FPGA is configured to perform the logical memory address translation.

The configurable PCIe interface 120 enables connection of the smart NIC 100 to the other physical components of a computer system via a PCIe bus 125 of the computer system. Via this configurable PCIe interface 120, the smart NIC 100 can present itself to the computer system as a multitude of devices, including a data message processing NIC, a hard disk (using non-volatile memory express (NVMe) over PCIe), or other types of devices. As shown, also connected to the PCIe bus 125 is a set of CPU(s) 130 of a host computer 135. In some embodiments, one or more storage (e.g., NVMe) devices accessible as part of the smart NIC logical memory may also connect to the PCIe bus.

The host computer 135 includes at least a set of CPUs 130 (e.g., a single processor, a multi-core processor, etc.) and a memory (e.g., one or more random access memories) 145. In different embodiments, the host computer 135 may be a bare metal (i.e., non-virtualized) computing device or may operate a set of virtualized data compute nodes (e.g., containers, virtual machines, etc.). The host computer CPU 130 executes a network stack as well as various other processes (e.g., operating system, hypervisor, applications, etc.), making use of the memory 145. A portion of the memory 145 is allocated to I/O virtual memory for use by the network stack executing on the host computer CPU 130.

The host computer 135, via the smart NIC 100, connects through a network 150 to a set of network storage devices 140. These network devices 140, in some embodiments are non-volatile memory express (NVMe) devices that are accessible via NVMe-over-fabric protocols (e.g., NVMe-over-TCP). In other embodiments, the network devices 140 are accessible in a different manner. The network devices 140, along with the smart NIC memory 115 and/or the host computer memory 145 are combined to form a logical memory accessible by the NIC 100. In other embodiments, the logical memory only encompasses the network storage devices 140.

In some embodiments, as shown, the network storage devices 140 are fully separate from the host computer 135 and other host computers 160 that access these devices. These storage devices 140 are accessed by the NICs of multiple computers, which use a similar logical memory translation scheme to access data stored in the network storage devices 140. These host computers 160, in some embodiments, all execute similar client processes. As an example, the host computers 135 and 160 could all execute a distributed machine learning process, with the individual instances each retrieving machine learning parameters and/or inputs from the storage devices 140. In some such embodiments, the local smart NIC memory 115 and host computer memory 145 are not actually part of the logical memory, which is the same across all of the smart NICs of these computers. In other embodiments, the computers 135 and 160 may operate unrelated client processes that simply use the set of network storage devices 140 for their own respective inputs and/or outputs.

In other embodiments, the network devices include some or all of the computers on which the client processes operate. In this case, for at least a subset of the smart NICs, the logical memory spans local memory (i.e., the smart NIC and/or host computer memory) as well as the network storage devices (which might actually be the other computers with their own client processes). For instance, in the previously-mentioned distributed machine learning process, each of the computers executing client processes that perform training of a machine learning model might also store a subset of the network inputs and/or parameters.

Figure 2:
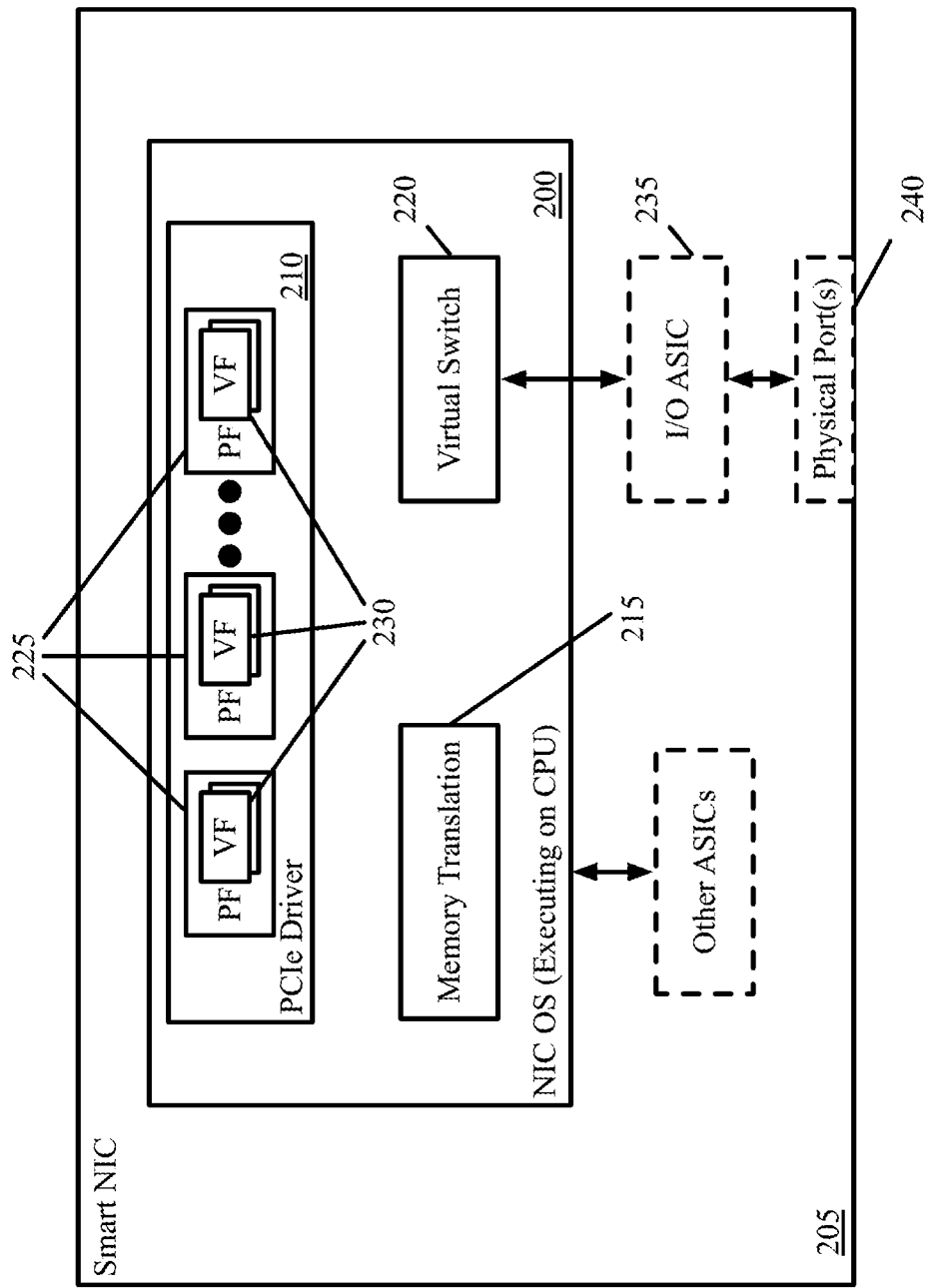
FIG. 2 conceptually illustrates the NIC OS of a smart NIC of some embodiments.

In some embodiments, the CPU 105 of the smart NIC 100 executes a NIC operating system (OS) that controls the ASICs 110 and can perform other operations as well, including logical memory address translation. FIG. 2 conceptually illustrates the NIC OS 200 of a smart NIC 205 of some embodiments. The NIC OS 200 is executed, in some embodiments, by the CPU of the smart NIC (e.g., CPU 105). This NIC OS 200 includes a PCIe driver 210, a virtual switch 220, and a memory translation function 215.

The PCIe driver 210 includes multiple physical functions 225, each of which is capable of instantiating multiple virtual functions 230. These different physical functions 225 enable the smart NIC to present as multiple different types of devices to the computer system to which it attaches via its PCIe bus. For instance, the smart NIC can present itself as a network adapter (for processing data messages to and from the computer system) as well as an NVMe disk in some embodiments.

The NIC OS 200 of some embodiments is capable of executing a virtualization program (similar to a hypervisor) that enables sharing resources (e.g., memory, CPU resources) of the smart NIC among multiple machines (e.g., VMs) if those VMs execute on the computer. The virtualization program can provide compute virtualization services and/or network virtualization services similar to a managed hypervisor in some embodiments. These network virtualization services, in some embodiments, include segregating data messages into different private (e.g., overlay) networks that are defined over the physical network (shared between the private networks), forwarding the data messages for these private networks (e.g., performing switching and/or routing operations), and/or performing middlebox services for the private networks.

To implement these network virtualization services, the NIC OS 200 of some embodiments executes the virtual switch 220. The virtual switch 220 enables the smart NIC 205 to perform software-defined networking and provide the I/O ASIC 235 of the smart NIC 205 with a set of flow entries (e.g., the cache entries described herein) so that the I/O ASIC 235 can perform flow processing offload (FPO) for the computer system in some embodiments. The I/O ASIC 235, in some embodiments, receives data messages from the network and transmits data messages to the network via one or more physical network ports 240.

The memory translation function 215 executed by the NIC operating system 200 of some embodiments translates between logical memory addresses and physical or virtual memory addresses of multiple devices, including the physical NIC memory, memory of the host computer, one or more network devices, etc. In some embodiments, the memory translation function 215 translates logical memory addresses into network addresses of the network devices (or even directly into NVME-over-fabric messages). The NIC OS 200 can also include various other operations, including operations not directly related to data message processing (e.g., operations for a machine-learning system).

In other embodiments, as indicated above, the NIC does not run a full NIC OS. Instead, either a lightweight CPU (e.g., a non-x86/ARM processor) or an ASIC or FPGA is configured to perform the logical memory address translation. In this case, the NIC is also capable of performing typical I/O data message processing functions.

Figure 3:
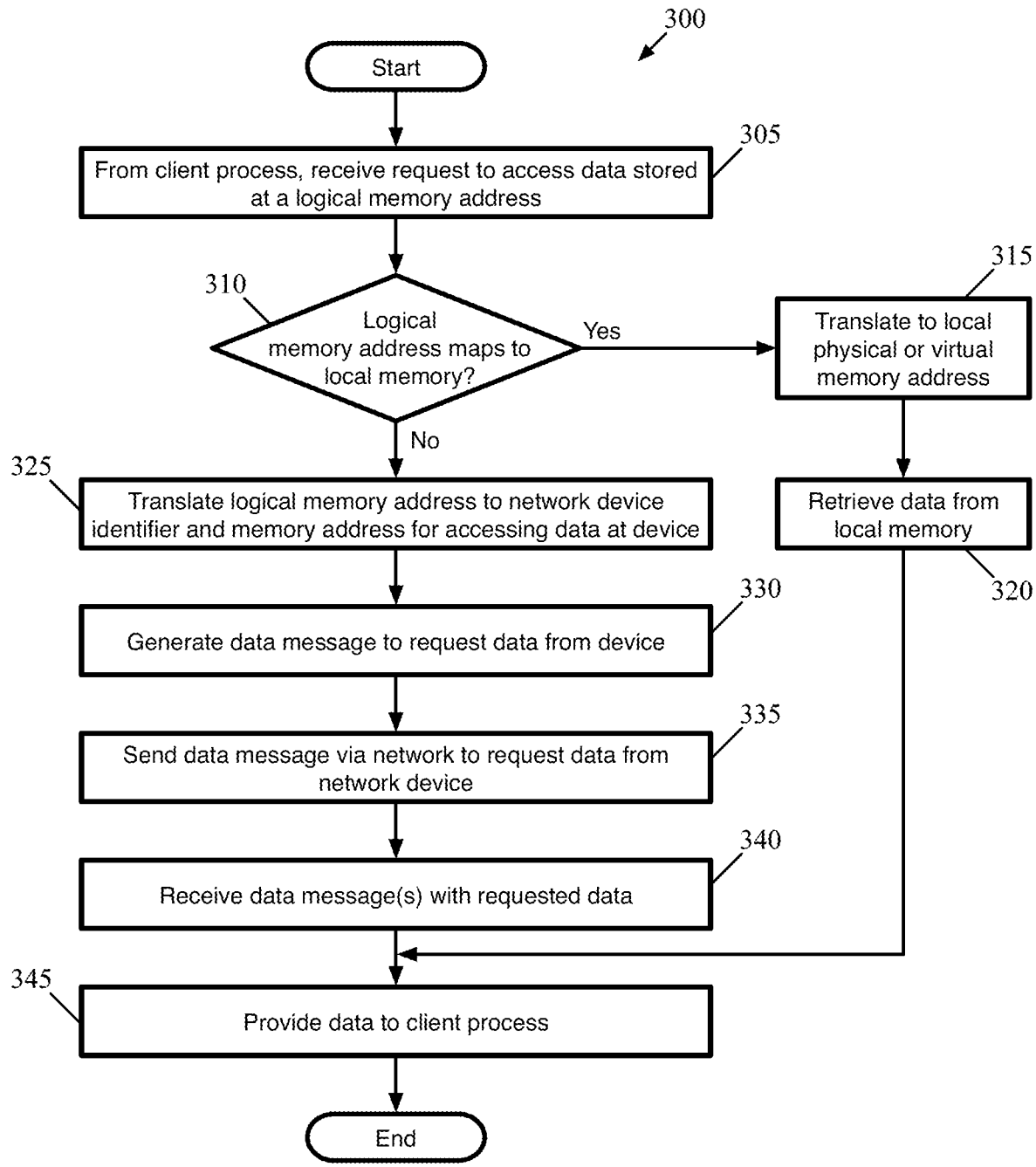
FIG. 3 conceptually illustrates a process of some embodiments for translating a logical memory address into a physical or virtual memory address of a particular device.

FIG. 3 conceptually illustrates a process 300 of some embodiments for translating a logical memory address into a physical or virtual memory address of a particular device. The process 300 is performed by a smart NIC, in some embodiments, in the context of a client process attempting to access data stored at the logical memory address. In different embodiments, the data could be for consumption by the client process (e.g., in a distributed machine learning system), as part of the client process sending a data message or set of data messages (e.g., when streaming a requested file), or a combination thereof. The process 300 will be described in part by reference to FIGS. 4 and 5, which conceptually illustrate examples of client processes accessing file data on a network storage device and the translation tables used to enable this translation according to some embodiments.

As shown, the process 300 begins by receiving (at 305) a request to access data stored at a logical memory address from a client process. In some embodiments, the client process sends this request directly to the NIC, while in other embodiments other operations (e.g., a network stack of the host computer) act as intermediaries between the client process and the NIC. The client process, in some embodiments, simply requests a file (e.g., via its filename). In some such embodiments, the file name acts as the logical memory address (i.e., the NIC translation logic is configured to directly translate the filename into a device and memory location). In other embodiments, an intermediary process translates the filename into a logical memory address or the client process itself uses a logical memory address in its request to the NIC.

Figure 4:
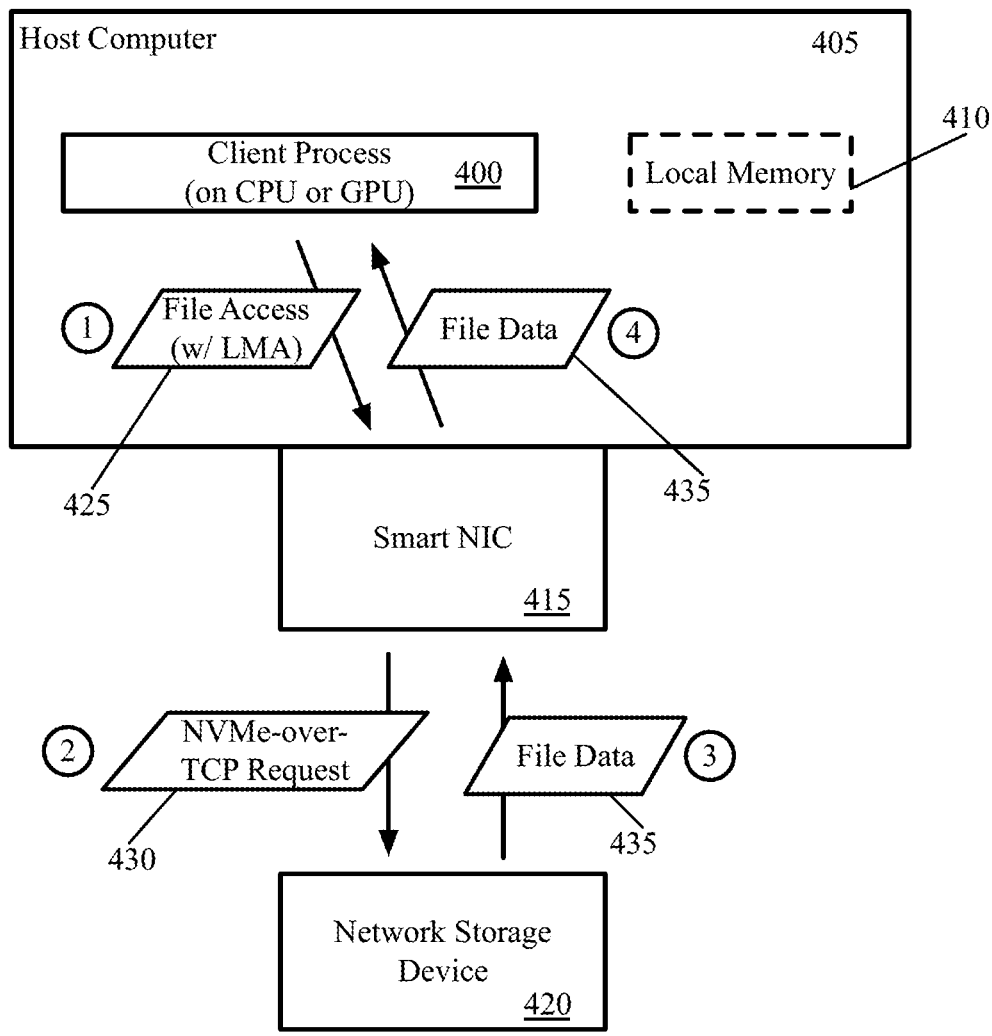
FIG. 4 conceptually illustrates a client process executing on a host computer and accessing data from a network storage device via a smart NIC of the host computer.

FIG. 4 conceptually illustrates a client process 400 executing on a host computer 405 (e.g., on a CPU or GPU of the host computer 405) and accessing data from a network storage device 420 via a smart NIC 415 of the host computer 405. The host computer 405 also includes a local memory 410. As shown by the encircled 1, the client process 400 sends a file access request (with a logical memory address) 425 to the smart NIC 415. This file access request 425 could be a read request, a TCP or UDP message specifying to read a particular file and/or from a particular memory location, or other manner of accessing a file.

The process 300 then determines (at 310) whether the logical memory address maps to local memory. It should be understood that the process 300 is a conceptual process and, in some embodiments, the NIC does not actually make this specific determination. Rather, the NIC of some embodiments translates the logical memory address to a device and memory address, which may correspond to a network device or a local memory. Other embodiments, however, do make a specific determination and use two different translation operations depending on whether the logical memory address corresponds to a network device or a local memory.

If the logical memory address maps to local memory, the process 300 translates (at 315) the logical memory address to a physical or virtual memory address of the local memory (e.g., the CPU or GPU on-board memory, smart NIC memory, an NVMe device locally connected to the PCIe bus, etc.). The process 300 also retrieves (at 320) this data from the local memory using the translated physical or virtual memory address (e.g., via a read operation).

On the other hand, if the logical memory address maps to a network device, the process 300 translates (at 325) the logical memory address to a network device identifier and a memory address for accessing the data at that network device. In some embodiments, the translation of the logical memory address specifies a network address (e.g., IP address) for a remote NVMe device as well as the memory address readable by the NVMe device. In some embodiments, the NIC uses a set of page tables or other memory address translation tables to determine these values.

Figure 5:
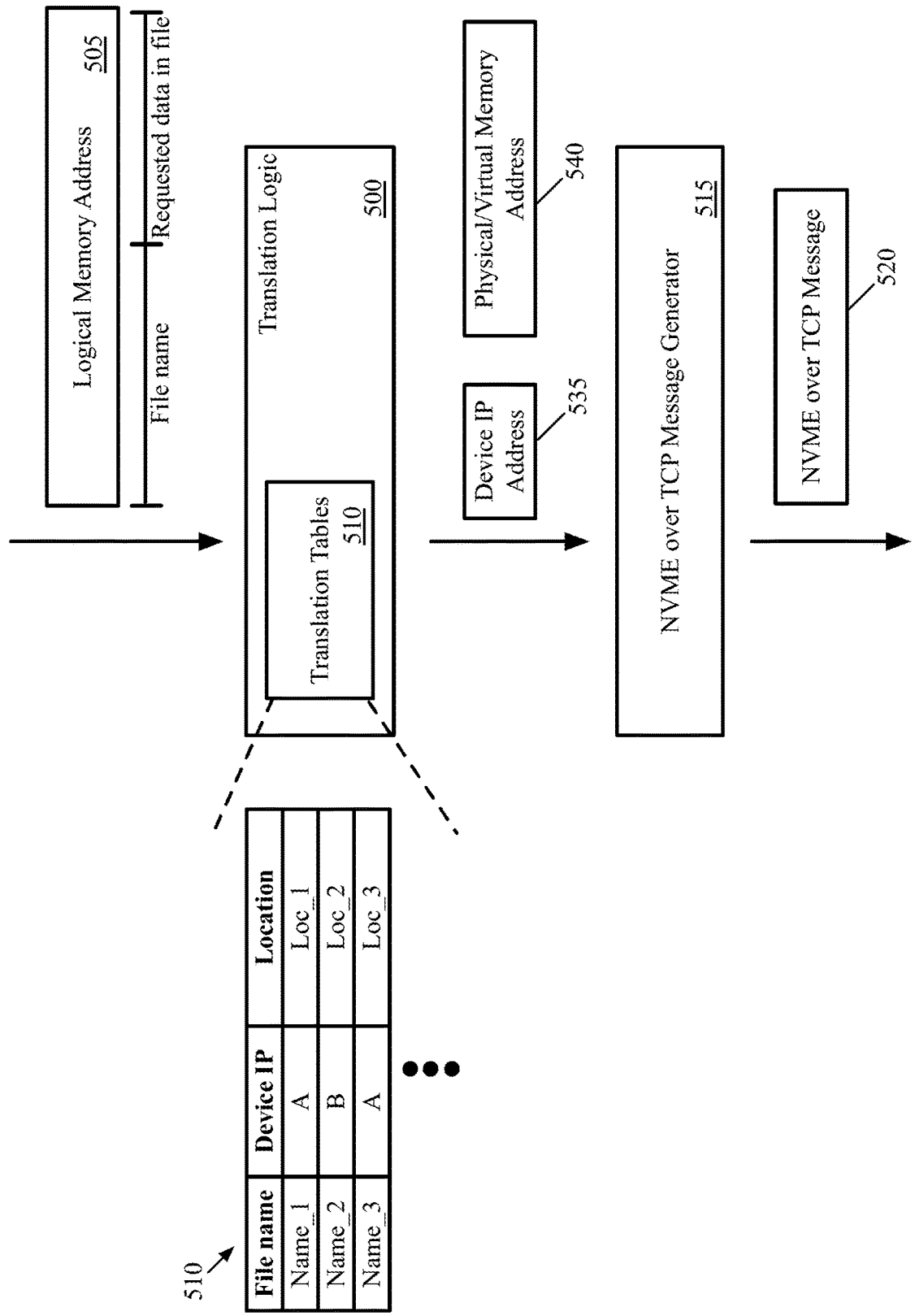
FIG. 5 conceptually illustrates an example logical memory address of some embodiments that is provided to a smart NIC and the translation of that logical memory address by the smart NIC.

FIG. 5 conceptually illustrates an example logical memory address 505 of some embodiments that is provided to a smart NIC and the translation of that logical memory address by the smart NIC. As mentioned, in some embodiments the logical memory address 505 represents a particular file or a particular location within a file (e.g., a particular set of bits of a file). In some embodiments, the logical memory address 505 is provided as a file name and a location within the file. The logical memory address 505, in some embodiments, is structured in such a way that if a file is moved from one network storage device to another, it retains the same logical memory address so that the client processes do not need to change their actions to access those files. That is, in some embodiments the logical memory address 505 does not include a specific portion specifying a device, because a particular file may be moved from one device to another. As shown, the logical memory address 505 includes a first portion that indicates the file name and a second portion indicating a portion of the data that is requested. The requested data, in different embodiments, may indicate the entire file, a starting point and ending point within the file, or a starting point and number of bits of the file that should be read. It should be understood that this is only one possible structure for a logical memory address, and that various different structures may be used so long as those logical memory addresses (i) can be translated to an identification of a device and a memory location of that device and (ii) are transparent to changes to the location of the actual data being requested.

The translation logic 500 of the smart NIC includes a set of translation tables 510 that allow the NIC to translate the logical memory address 505. These translation tables 510, in some embodiments, map the file name (or other portion of the logical memory address) to a device identifier (in this case a device IP address) and a location of the file in the storage of that device. Thus, a first file name maps to a first location (Loc_1) on device A (and provides the IP address for that device), a second file name maps to a second location on device B (and provides the IP address for device B), a third file name maps to a third location on device A, etc. This information enables the translation logic 500 to output a device IP address 535 and a physical (or virtual) memory address 540 for that device. In addition, different embodiments refer to the requested data using a starting location and ending location in memory or by using a starting location and amount (e.g., 1500 kb) of subsequent data within the memory that need to be read.

Returning to the FIG. 3, the process 300 generates (at 330) a data message to request the data from the identified device. In some embodiments, the data message is an NVMe-over-fabric message (e.g., NVMe-over-TCP) that is generated based on the network address of the identified device and the memory location of the requested data that is identified for that device. FIG. 5 shows that an NVMe-over-TCP message generator 515 uses the device IP address 535 and the physical or virtual memory address information 540 to generate an NVMe-over-TCP message 520 (e.g., an NVMe-over-TCP command capsule packet data unit), which may be sent as one or more TCP segments. In some embodiments, the translation logic uses the translation tables 510 to translate the logical memory address directly into an NVMe-over-fabric message.

Next, the process 300 sends (at 335) the generated data message via the network to request data from the network device. In the NVMe-over-TCP case, the NIC generates an NVMe-over-TCP command capsule packet data unit (PDU) that requests the specified data from the NVMe device. This PDU is incorporated into one or more TCP segments (using the identified device IP address) and sent to the NVMe device through the network (i.e., the network to which the smart NIC connects the host computer). FIG. 4 shows that, based on the file access request 425, the smart NIC 415 sends an NVMe-over-TCP request message 430 to the network storage device 420. This request message 430 may be sent as one or more TCP segments, depending on the amount of data required (typically a request message will only require a single TCP segment).

After a period of time, the process 300 receives (at 340) one or more data messages with the requested data (unless there is a fault or other error that causes the network storage device to respond with an error message). If a large file is requested, the network storage device may need to send multiple messages (e.g., multiple TCP segments) in order to transfer the entire file to the NIC. In some embodiments, after all of the data has been sent, the network storage device sends an additional message to specify that the data transfer is complete. In FIG. 4, this set of data messages is represented by the file data 435 sent from the network storage device 420 to the smart NIC 415.

Whether the data is retrieved by the NIC from a network storage device or from a local memory, the process 300 provides (at 345) the retrieved data to the client process that requested the data, then ends. In some embodiments, the NIC reconstructs the file from multiple data messages (e.g., the NVMe-over-TCP messages) received from the network storage device before providing the file to the client process. FIG. 4 shows that the smart NIC 415 provides the file data 435 to the client process 400.

As mentioned, the data storage arrangement is transparent to the client processes that access the data in some embodiments. In fact, this storage arrangement is transparent to the CPUs of the computers on which these client processes operate. For this to be the case, the translation tables stored by the NICs need to be configured and kept up to date with any movement of data from one network storage device to another. The data request from a client process for a particular file is the same, irrespective of whether that file is located on one network storage device or another.

When a computer is booted up, the NIC of that computer sends a request to the network to learn the logical memory address translation configuration (e.g., a set of page tables or other configuration data) in some embodiments. In some embodiments, a central storage manager sends the translation configuration to the NIC so that the NIC can store this translation configuration and use the configuration for logical memory addresses. In other embodiments, each network device that stores data sends its information to the NIC in order for the NIC to generate the translation configuration.

Figure 6:
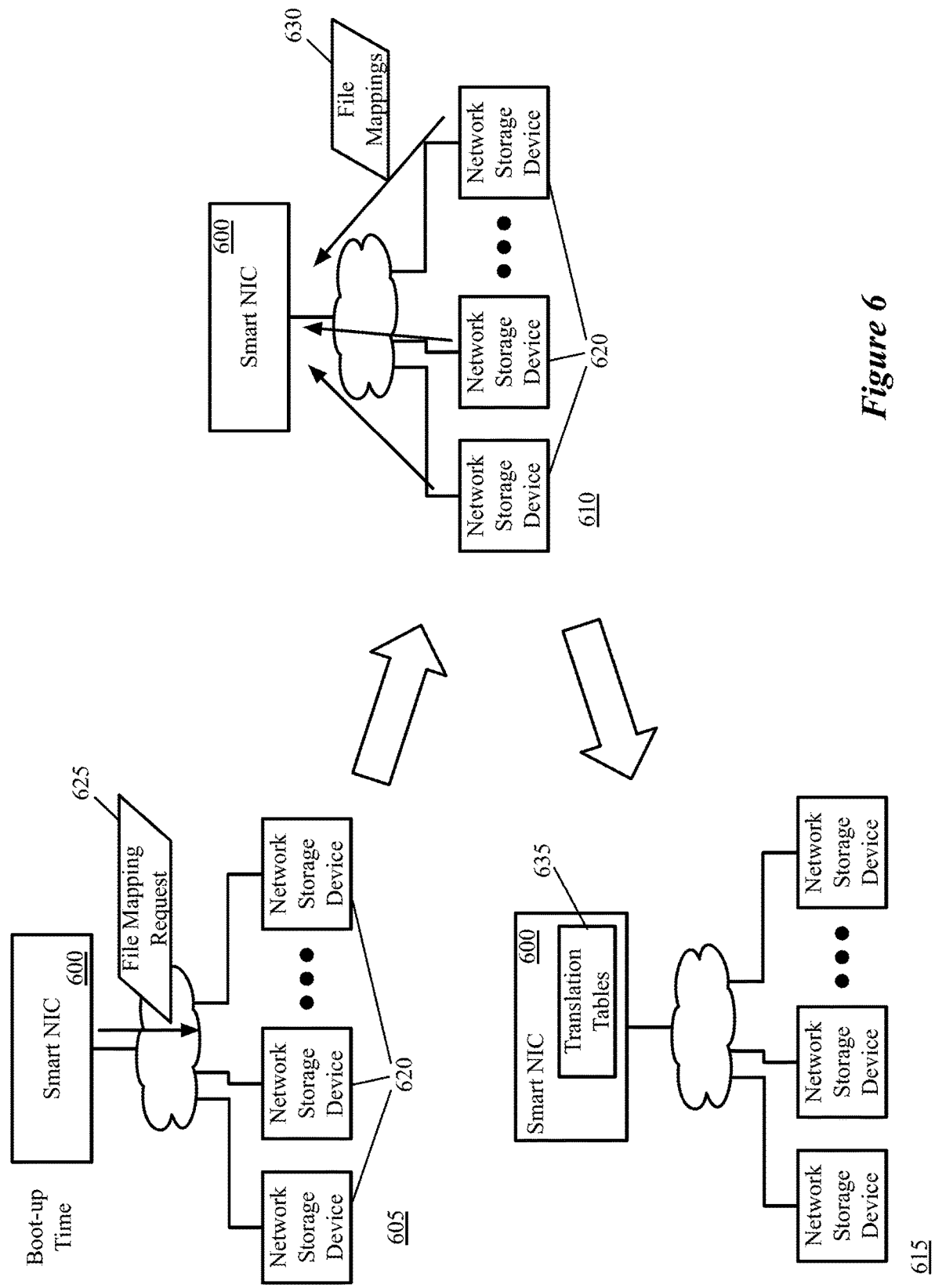
FIG. 6 conceptually illustrates a set of network storage devices sending mapping data to a smart NIC when the smart NIC boots up.

FIG. 6 conceptually illustrates a set of network storage devices 620 sending mapping data to a smart NIC 600 when the smart NIC 600 boots up, over three stages 605-615. In the first stage 605, upon booting up, the smart NIC 600 sends a file mapping request 625 to each of the network storage devices 620. As the smart NIC 600 does not necessarily know the individual addresses of all of the network storage devices 620 (or even how many devices are currently present), in some embodiments the smart NIC 600 is configured to send a broadcast or multicast message to a specific broadcast or multicast address that will reach any network storage devices 620. In other embodiments, the smart NIC 600 is configured to send a message to a storage controller or other centralized entity.

In the second stage 610, the network storage devices 620 reply to the smart NIC 600 to indicate their respective file mappings 630. In some embodiments, each device 620 sends a message or set of messages with (i) its network address (e.g., in the network layer header of the message) and (ii) the information needed for the smart NIC 600 to translate logical memory addresses and/or file names into memory addresses for that device 620. In some embodiments, each network device 620 sends to the smart NIC 60 its page tables that enable this mapping, or a set of data that allows the smart NIC 600 to generate the page tables (e.g., a listing of file names and their starting locations within the device memory). As mentioned, in other embodiments, a central repository stores the network page tables (along with the network address for each device) and provides this data to each of the smart NICs upon bootup. The third stage 615 illustrates that the smart NIC 600 now stores a set of translation tables 635 that it can use to translate data access requests from any client processes running on its host computer.

The network storage may not be static. New data could be stored on the device (e.g., in the machine learning context, new inputs and/or modified parameters), other data might be deleted, data can be moved from one device to another, and new devices might be added while others are removed from the network. When changes occur, the network storage devices of some embodiments publish their respective changes to the network so that the smart NICs will have the most up-to-date translation tables. These changes may be published to the set of smart NICs that have previously contacted the network storage devices in some embodiments. In other embodiments, the network storage devices publish their updates by broadcasting the updates or sending the updates to a multicast address to which all of the smart NICs subscribe, or by providing updates to a centralized controller or repository that then publishes these updates to the smart NICs.

Figure 7:
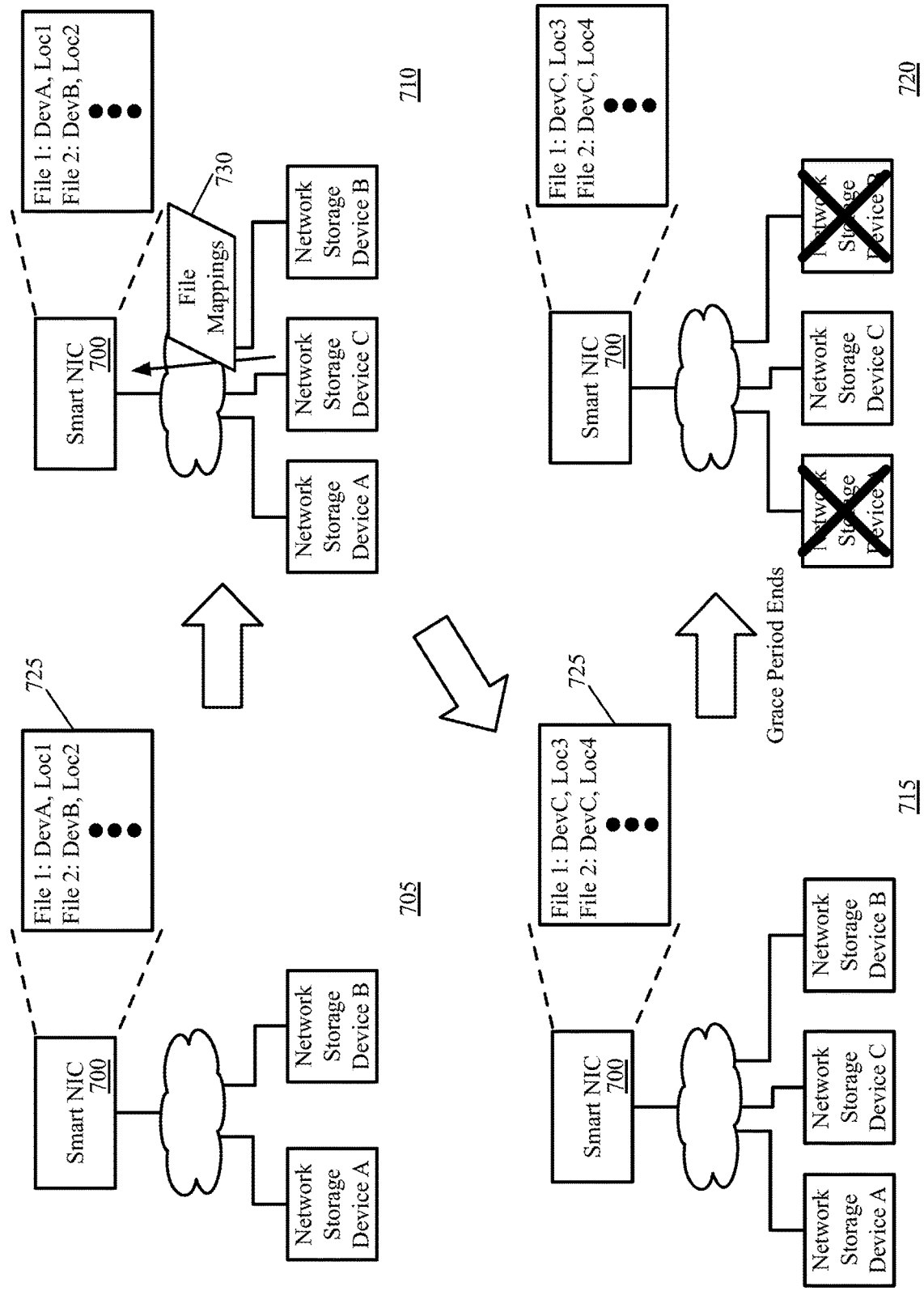
FIG. 7 conceptually illustrates the replacement of two network storage devices with a new network storage device.

FIG. 7 conceptually illustrates the replacement of two network storage devices A and B with a new network storage device C over four stages 705-720. As shown, in the first stage 705, a smart NIC 700 stores a translation table 725 that provides information for at least two files 1 and 2. File 1 is located on network storage device A (at a first location) and file 2 is located on network storage device B (at a second location).

In the second stage 710, a new network storage device C is added to the network to consolidate the data stored on current devices A and B. As shown, this new network storage device C transmits its new updated file mapping information 730 to the smart NIC 700. In some embodiments, the devices A and B that will be brought offline soon also notify the smart NIC 700 (and any other smart NICs that access their data) in order for the smart NIC 700 to remove mappings to these devices in its translation table 725.

The third stage 715 shows that the smart NIC 700 has used the updated file mapping to update its translation table 725. Both file 1 and file 2 are now located on network storage device C at different locations. The client processes can continue sending data requests without any knowledge that this data has moved to device C.

In some embodiments, for changes that involve moving data from one storage device to another (as this change effectively moves data from devices A and B to device C), a grace period is provided such that the data is stored at its old location for a period of time after the new configuration is sent before being deleted from the old location. Stage 720 indicates that once the grace period ends the devices A and B can be removed from the network.

Figure 8:
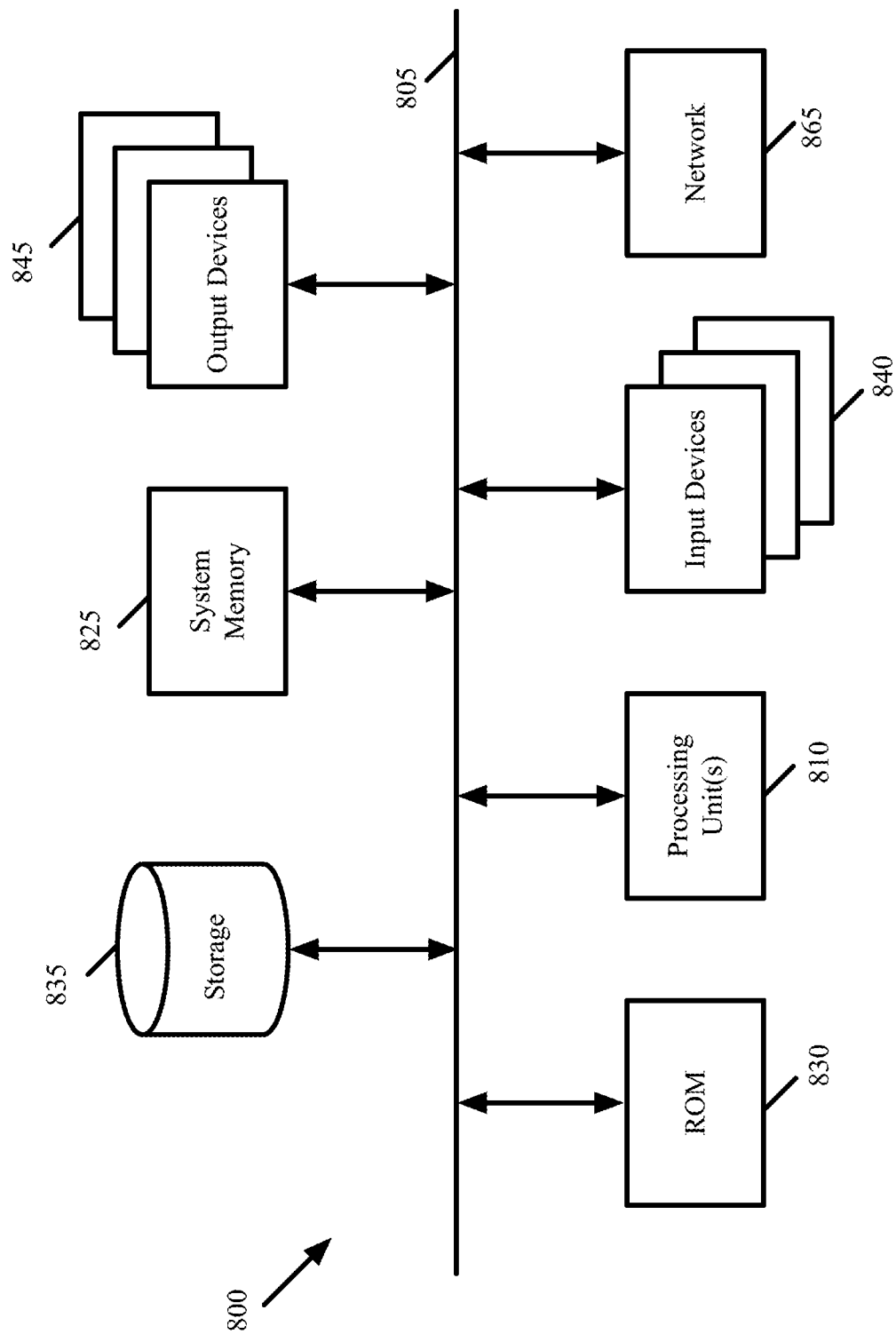
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIG. 3) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for accessing data in a network, the method comprising:
   receiving, by a network controller (NIC), a first set of configuration data from a first network device for translating logical memory addresses into memory addresses of the first network device;
   receiving a request to access data stored at a logical memory address;
   translating the logical memory address into a memory address of the first network device that stores the requested data using a translation table;
   replacing, by a second network device replaces, the first network device in a storage network after sending a data message to retrieve the request data; and receiving a second set of configuration data from a second network device for translating the logical memory addresses into memory addresses of the second network device, wherein the first network device is shut down after a grace period that allows for the NIC and NICs of other computers to update configuration data for translating logical memory addresses.

2. The method of claim 1, wherein the request is received from a client process executed by a processing unit of the computer.

3. The method of claim 2, wherein modifications to a location of the data in the network are transparent to the client process.

4. The method of claim 1, wherein the request is a first request and the logical memory address is a first logical memory address, the method further comprising:
from the computer, receiving a second request to access data stored at a second logical memory address;
translating the second logical memory address into a memory address of a local memory of the computer; and
reading the requested data from the local memory using the translated memory address.

5. The method of claim 1, wherein translating the logical memory address comprises determining a network address for the particular network device and a logical block address for reading data at a specific memory location of the particular network device.

6. The method of claim 5, wherein the network address is used to send the data message to the particular network device.

7. The method of claim 1, wherein the data message is a non-volatile memory express (NVMe) over fabric data message.

8. The method of claim 1 further comprising:
receiving a set of data messages from the particular network device conveying the requested data; and
providing the requested data to the computer.

9. The method of claim 1, wherein the data message is sent to the first network device.

10. The method of claim 1 further comprising receiving configuration data from a plurality of respective network devices for translating respective sets of logical memory addresses into memory addresses of the respective network devices.

11. The method of claim 1 further comprising updating the translation table.

12. The method of claim 11, further comprising detecting a network change cause updating the translation table.

13. A network interface controller (NIC) device comprising:
a memory storing a translation table for converting logical memory addresses;
a processor configured to:

receive a first set of configuration data from a first network device for translating logical memory addresses into memory addresses of the first network device;
translate the logical memory address into a memory address of the first network device using the translation table;
send a data message to the first network device to retrieve the requested data, wherein after the sending of the data message a second network device replaces the first network device in a storage network; and
receiving a second set of configuration data from a second network device for translating the logical memory addresses into memory addresses of the second network device, wherein the first network device is shut down after a grace period that allows for the NIC and NICs of other computers to update configuration data for translating logical memory addresses.

14. The device of claim 13, wherein the request is received from a client process executed by a processing unit of the computer, wherein modifications to a location of the data in the network are transparent to the client process.

15. The device of claim 13, wherein the request comprises a first request and the logical memory address comprises a first logical memory address, wherein the processor is further configured to:
from a computer, receive a second request to access data stored at a second logical memory address;
translate the second logical memory address into a memory address of a local memory of the computer; and
read the requested data from the local memory using the translated memory address.

16. The device of claim 13, wherein the processor is further configured to determine a network address for the particular network device and a logical block address for reading data at a specific memory location.

17. The device of claim 16, wherein the network address is used to send the data message to the particular network device.

18. The device of claim 13, wherein the processor is further configured to:
receive a set of data messages from the particular network device conveying the requested data; and
provide the requested data to the computer.

19. The device of claim 13, wherein the processor is further configured to update the translation table.

20. The device of claim 13, wherein the processor is further configured to process configuration data from a plurality of respective network devices for translating respective sets of logical memory addresses into memory addresses of the respective network devices.

* * * * *